US009846439B2

(12) United States Patent
Carman et al.

(10) Patent No.: US 9,846,439 B2
(45) Date of Patent: Dec. 19, 2017

(54) AUTOMATIC FLOW REGULATOR FOR FUME GUN

(71) Applicant: Illinois Tool Works Inc., Glenview, IL (US)

(72) Inventors: Bradley G. Carman, Chicago, IL (US); Anders Olof Rostlund, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 936 days.

(21) Appl. No.: 13/856,804

(22) Filed: Apr. 4, 2013

(65) Prior Publication Data

US 2013/0291951 A1 Nov. 7, 2013

Related U.S. Application Data

(60) Provisional application No. 61/643,071, filed on May 4, 2012.

(51) Int. Cl.
*B23K 9/32* (2006.01)
*G05D 7/06* (2006.01)
*B08B 15/04* (2006.01)

(52) U.S. Cl.
CPC ............ *G05D 7/0617* (2013.01); *B08B 15/04* (2013.01); *B23K 9/325* (2013.01); *Y10T 137/0368* (2015.04); *Y10T 137/7759* (2015.04)

(58) Field of Classification Search
CPC ...................................................... B23K 9/325
USPC ................................ 219/137.41, 136, 137 R
See application file for complete search history.

(56) References Cited

U.S. PATENT DOCUMENTS 3,775,587 A * 11/1973 Lindkvist ................ B08B 15/04
219/136
3,886,344 A * 5/1975 Frantzreb, Sr. ......... B08B 15/04
219/136
4,016,398 A * 4/1977 Herrick .................... B08B 15/04
219/136

(Continued)

FOREIGN PATENT DOCUMENTS

JP H11170054 6/1999

OTHER PUBLICATIONS

International Search Report from PCT application No. PCT/US2013/039212 dated Aug. 19, 2013, 13pgs.

*Primary Examiner* — Dana Ross
*Assistant Examiner* — Lawrence Samuels
(74) *Attorney, Agent, or Firm* — McAndrews, Held & Malloy, Ltd.

(57) ABSTRACT

Systems and methods for automatically regulating the flow of fumes suctioned through a welding fume gun are provided. In certain embodiments, an automatic flow control assembly includes a vacuum system configured to suction a vacuum fume flow through an internal passage of a welding fume gun. The automatic flow control assembly also includes a sensor configured to measure a parameter related to the vacuum fume flow. The automatic flow control assembly further includes a flow regulation device configured to regulate an ambient air flow introduced into the vacuum fume flow. In addition, the automatic flow control assembly includes control circuitry configured to control the flow regulation device based at least in part on the measured parameter related to the vacuum fume flow.

19 Claims, 5 Drawing Sheets

(56) References Cited

U.S. PATENT DOCUMENTS

| | | | | |
|---|---|---|---|---|
| 5,079,404 A * | 1/1992 | Zamuner | ................ | B23K 9/325 |
| | | | | 219/137.41 |
| 5,182,435 A * | 1/1993 | Wang | .................... | B23K 3/029 |
| | | | | 219/137.41 |
| 5,906,760 A * | 5/1999 | Robb | ...................... | B08B 15/00 |
| | | | | 219/121.67 |
| 2004/0230169 A1 * | 11/2004 | Felix | ................... | A61M 1/0047 |
| | | | | 604/317 |
| 2006/0226136 A1 | 10/2006 | Zamuner | | |
| 2009/0065489 A1 * | 3/2009 | Duffy | ................. | B23K 9/0956 |
| | | | | 219/137 R |
| 2009/0107970 A1 * | 4/2009 | Norrish | ................ | B23K 9/167 |
| | | | | 219/137 R |
| 2009/0321403 A1 * | 12/2009 | Brenneke | ............ | B23K 37/006 |
| | | | | 219/137.41 |

* cited by examiner

AUTOMATIC FLOW REGULATOR FOR FUME GUN

CROSS-REFERENCE TO RELATED APPLICATION

This application claims priority from and the benefit of U.S. Provisional Application Ser. No. 61/643,071, entitled "AUTOMATIC FLOW REGULATOR FOR FUME GUN," filed May 4, 2012, which is hereby incorporated by reference in its entirety for all purposes.

BACKGROUND

The present invention relates generally to welding guns and, more particularly, to an automatic flow regulator for use in a welding fume gun.

During a welding process, fumes and other particulates are introduced into the work environment that can be undesirable to the workplace environment. For example, in welding processes that utilize shielding gas, it is important that the shielding gas envelopes the weld in order to get a good weld. In order to remove the fumes and particulates that are generated during the welding process, a suction device may be added to the process. Such welding guns are often referred to as fume guns (i.e., welding torches with integrated fume removal features). However, conventional fume guns typically do not offer vacuum flow regulation to enable optimal vacuum flow. Rather, conventional vacuum systems used with fume guns often operate at only one setting (or a limited number of discrete settings).

BRIEF DESCRIPTION

In one embodiment, an automatic flow control assembly includes a vacuum system configured to suction a vacuum fume flow through an internal passage of a welding fume gun. The automatic flow control assembly also includes a sensor configured to measure a parameter related to the vacuum fume flow. The automatic flow control assembly further includes a flow regulation device configured to regulate an ambient air flow introduced into the vacuum fume flow. In addition, the automatic flow control assembly includes control circuitry configured to control the flow regulation device based at least in part on the measured parameter related to the vacuum fume flow.

In another embodiment, a method includes measuring a parameter related to a vacuum fume flow suctioned from a welding fume gun by a vacuum system. The method also includes regulating an ambient air flow introduced into the vacuum fume flow based at least in part on the measured parameter related to the vacuum fume flow.

In another embodiment, an automatic flow control assembly includes a welding fume gun, which includes an internal passage configured to facilitate suctioning of welding fumes from a welding workpiece. The automatic flow control assembly also includes a vacuum and weld cable assembly that connects the welding fume gun to a welding system. In addition, the automatic flow control assembly includes a vacuum system assembly connected to the vacuum and weld cable assembly. The vacuum system assembly includes a vacuum system configured to generate a vacuum to suction the welding fumes through the internal passage of the welding fume gun, the vacuum and weld cable assembly, and a vacuum transfer tube of the vacuum system assembly. The vacuum transfer tube connects the vacuum and weld cable assembly to the vacuum system. The vacuum system assembly also includes a pitot tube sensor at least partially disposed in the vacuum transfer tube. The pitot tube sensor is configured to measure a pressure differential associated with a flow of the welding fumes through the vacuum transfer tube. The vacuum system assembly further includes a butterfly valve actuated by a servo motor. The butterfly valve and the servo motor are disposed in an ambient air flow line adjacent the vacuum transfer tube. The butterfly valve is configured to regulate a flow of ambient air into the flow of welding fumes through the vacuum transfer tube. In addition, the vacuum system assembly includes control circuitry configured to control actuation of the servo motor based at least in part on the pressure differential measured by the pitot tube sensor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The embodiments described herein include a fume gun and associated vacuum system that enable optimized vacuum flow to remove fumes and other particulates from a welding process. As such, the embodiments described herein provide a minimal amount of vacuum as to not waste energy, but still maintain acceptable smoke capture efficiency. Further, the embodiments described herein provide a minimal amount of vacuum as to not interfere with the shielding gas flow and/or the weld puddle. In particular, the vacuum flow may be maintained at a target setpoint regardless of changes (e.g., filter clogging, system load changes such as fume guns being added or removed, vacuum tubing restriction changes such as kinks, and so forth). Therefore, the embodiments described herein achieve automatic regulation of vacuum flow for a fume gun to provide optimal vacuum flow.

In order to ensure that the shielding gas and/or the weld puddle is not disturbed, the vacuum flow level is maintained below a maximum level $Q_{max}$, which will be different depending on the shielding gas flow, welding parameters, environmental factors, and so forth. However, in order to achieve an acceptable capture efficiency, the vacuum flow is maintained above a minimum level $Q_{min}$. Therefore, the maximum and minimum levels Qmax and Qmin of the vacuum flow form an acceptable window of operation, which the embodiments described herein are capable of automatically maintaining without intervention from an operator. Conversely, as discussed above, conventional fume guns include vacuum systems that are typically oversized (i.e., that provide too much vacuum flow) and, as such, do not provide optimal vacuum flow.

In general, the embodiments described herein provide a bypass downstream of the fume gun, which is used to adjust the vacuum flow from the fume gun. In particular, the vacuum flow from the fume gun is measured and automatically (electronically or mechanically) adjusted with a variable valve (requiring little to no input from the operator). The variable valve bleeds air into the vacuum system at an appropriate flow rate such that the vacuum system can continue to operate at the same vacuum rate, while the vacuum rate from the fume gun is adjusted. As such, the embodiments described herein generally include multiple components, namely, a measurement system that measures the vacuum flow from the fume gun, and a flow control system that regulates the vacuum flow from the automatic flow control assembly (e.g., that includes the vacuum system).

Figure 1:
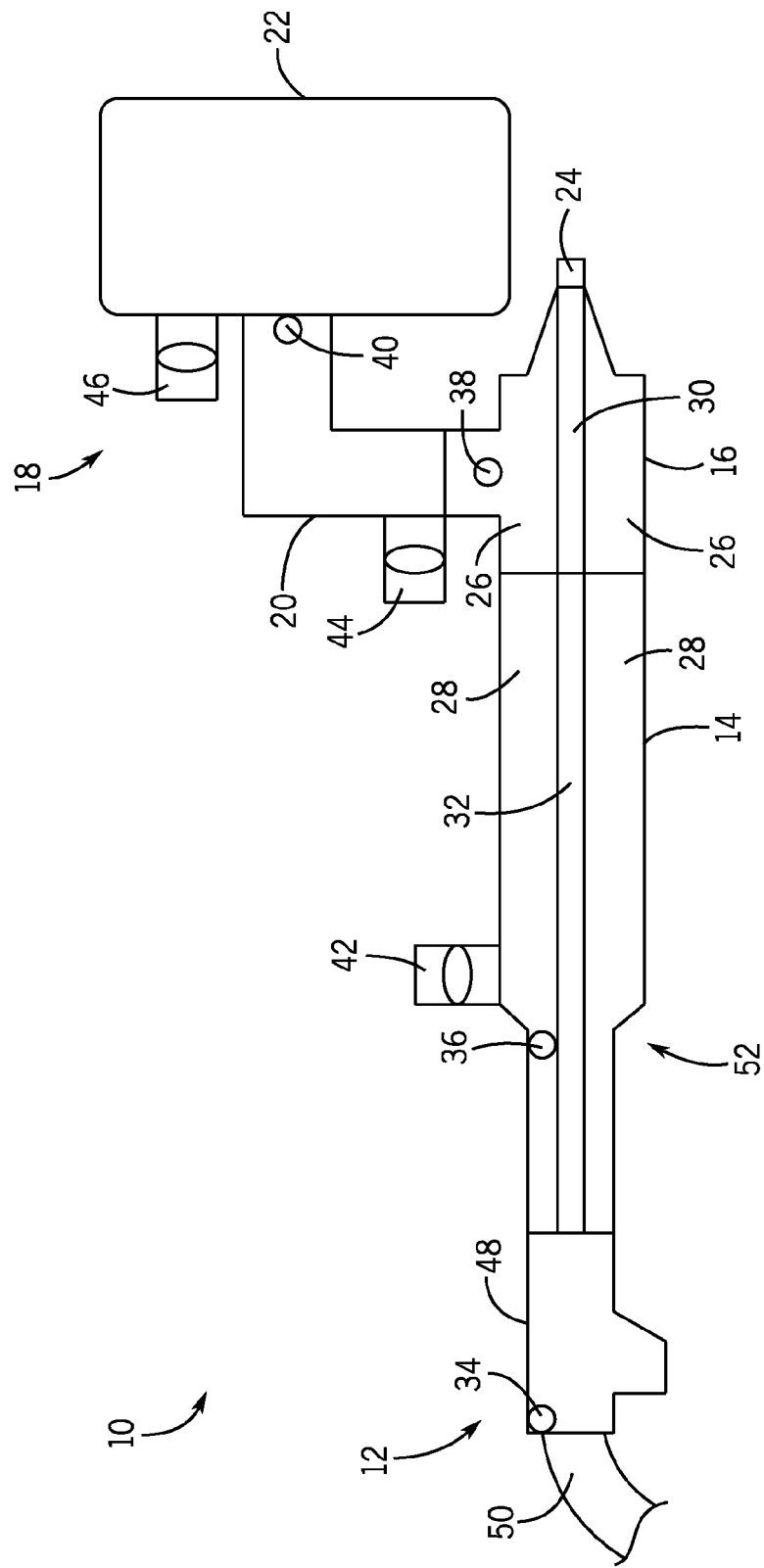
FIG. 1 is a schematic diagram of an embodiment of an automatic flow control assembly in accordance with aspects of the present disclosure.

Turning now to the figures, FIG. 1 is a schematic diagram of an embodiment of an automatic flow control assembly 10 in accordance with aspects of the present disclosure. As illustrated, the automatic flow control assembly 10 is connected to a fume gun 12 (e.g., a welding torch) attached to a vacuum and weld cable assembly 14 (e.g., including a tube disposed around a weld cable 32). In turn, the vacuum and weld cable assembly 14 is attached to a vacuum transfer attachment 16 (e.g., a T-junction) that connects the fume gun 12 to a vacuum system assembly 18, which includes a vacuum transfer tube 20 and a vacuum system 22. In addition, the vacuum and weld cable assembly 14 and/or the vacuum transfer attachment 16 are attached to a power pin 24 that connects the fume gun 12 to a welding system (e.g., a welding power source and/or welding wire feeder, and so forth), which supplies the fume gun 12 with welding supplies, such as electrical current, shielding gas, welding wire, and so forth, depending on the particular needs of the welding process being performed using the fume gun 12.

As described in greater detail below, the vacuum transfer attachment 16 includes a vacuum flow passage 26 configured to route a vacuum flow from a vacuum flow passage 28 of the vacuum and weld cable assembly 14 into the vacuum transfer tube 20. In certain embodiments, the vacuum flow passages 26, 28 of the vacuum transfer attachment 16 and the vacuum and weld cable assembly 14 are generally mating concentric tubular passages that surround a central passage 30 of the vacuum transfer attachment 16 and a weld cable 32 through the vacuum and weld cable assembly 14, respectively. The weld cable 32 facilitates the electrical current, shielding gas, welding wire, and so forth, to flow from the welding system to the fume gun 12. In general, the vacuum system 22 provides the vacuum that induces (e.g., suctions) the vacuum flow from the fume gun 12 through the vacuum flow passages 26, 28.

As also described in greater detail below, each of one or more sensors 34, 36, 38, 40 measures one or more parameters of the vacuum flow (e.g., pressure, pressure differential, flow rate, and so forth), and one or more automatic flow regulators 42, 44, 46 adjust the vacuum flow based on the measured vacuum flow parameters and, in certain embodiments, based on welding settings and/or real-time parameters such as welding process type (e.g., metal inert gas (MIG), tungsten inert gas (TIG), and so forth), voltage, current, wire feed speed, wire diameter, workpiece material thickness, and so forth, associated with the fume gun 12. Although illustrated in FIG. 1 as having four sensors 34, 36, 38, 40 and three automatic flow regulators 42, 44, 46, the automatic flow control assembly 10 may include any number of sensors and automatic flow regulators. In certain embodiments (e.g., the embodiments illustrated in FIGS. 2-5), the automatic flow control assembly 10 may include only one sensor and one automatic flow regulator. In certain embodiments, regardless of the numbers of sensors and automatic flow regulators used, the automatic flow regulators are located downstream of the sensors.

As used herein, the term "downstream" is generally intended to mean closer to the vacuum system 22 than to the fume gun 12 along the vacuum flow path from the fume gun 12, the vacuum and weld cable assembly 14, the vacuum transfer attachment 16, the vacuum transfer tube 20, and the vacuum system 22. Conversely, the term "upstream" is generally intended to mean closer to the fume gun 12 than to the vacuum system 22 along the vacuum flow path from the fume gun 12, the vacuum and weld cable assembly 14, the vacuum transfer attachment 16, the vacuum transfer tube 20, and the vacuum system 22.

As illustrated in FIG. 1, the sensors 34, 36, 38, 40 and automatic flow regulators 42, 44, 46 may be located at any number of locations in the automatic flow control assembly 10. For example, in certain embodiments, a sensor 34 may be located in a handle 48 of the fume gun 12, for example, at an upstream location (e.g., adjacent a neck 50 of the fume gun 12) of the handle 48. In certain embodiments, the vacuum and weld cable assembly 14 may include a diameter increase 52 downstream of the handle 48 of the fume gun 12. In certain embodiments, a sensor 36 may be located near the diameter increase 52 (e.g., at a location proximate to, and upstream from, the diameter increase 52) of the vacuum and weld cable assembly 14. In certain embodiments, a sensor 38 may be located near where the vacuum transfer attachment 16 connects to the vacuum transfer tube 20 (e.g., either in the vacuum transfer attachment 16 proximate to the vacuum transfer tube 20, or in the vacuum transfer tube 20 proximate to the vacuum transfer attachment 16). In certain embodiments, a sensor 40 may be located in the vacuum transfer tube 20 proximate to the vacuum system 22.

In addition, in certain embodiments, an automatic flow regulator 42 may be located near the diameter increase 52 (e.g., at a location proximate to, and downstream from, the diameter increase 52) of the vacuum and weld cable assembly 14. In certain embodiments, an automatic flow regulator 44 may be located in the vacuum transfer tube 20 (e.g., at an upstream location of the vacuum transfer tube 20 proximate to the vacuum transfer attachment 16). In certain embodiments, an automatic flow regulator 46 may be located near where the vacuum transfer tube 20 connects to the vacuum system 22. The automatic flow regulators 42, 44, 46 function as bypasses, which allow or block a flow of ambient air into the vacuum flow, thereby adjusting the vacuum flow from the fume gun 12 while maintaining the vacuum flow through the vacuum system 22 relatively constant. As such, the embodiments described herein may be retrofit into existing vacuum systems that operate at only one setting (or a limited number of discrete settings).

As described above, in certain embodiments, the automatic flow control assembly 10 may include only one sensor and only one automatic flow regulator. For example, FIGS. 2-5 are various illustrations of embodiments of the automatic flow control assembly 10 having one sensor 48 and one automatic flow regulator 50. In particular, both the sensor 48 and the automatic flow regulator 50 illustrated in FIGS. 2-5 are located in the vacuum transfer tube 20. More specifically, the sensor 48 is located in the vacuum transfer tube 20 between the vacuum transfer attachment 16 and the automatic flow regulator 50, and the automatic flow regulator 50 is located in the vacuum transfer tube 20 between the sensor 48 and the vacuum system 22. It should be noted that the sensor 48 illustrated in FIGS. 2-5 and the sensors 34, 36, 38, 40 illustrated in FIG. 1 are intended to be substantially similar, and the automatic flow regulator 50 illustrated in FIGS. 2-5 and the automatic flow regulators 42, 44, 46 illustrated in FIG. 1 are intended to be substantially similar.

Locating the sensor 48 and the automatic flow regulator 50 in the vacuum transfer tube 20 provides several tangible benefits. For example, locating the sensor 48 in the vacuum transfer tube 20 ensures that the sensor 48 is relatively close to a source of power (e.g., the vacuum system 22, the welding system to which the weld cable 32 is attached, and so forth). In addition, locating the sensor 48 in the vacuum transfer tube 20 ensures that the sensor 48 remains relatively static, as opposed to being located closer to the fume gun 12, which is often moved around in order to facilitate welding operations. As such, the sensor 48 is moved around relatively little, thereby enhancing the accuracy of the sensor 48 (e.g., reducing or even eliminating noise in the sensor 48 that may result from excessive movement) and enhancing the durability of the automatic flow control assembly 10. Furthermore, locating the sensor 48 in the vacuum transfer tube 20, and not in the fume gun 12 or the vacuum and weld cable assembly 14, does not add weight to the fume gun 12 or the vacuum and weld cable assembly 14.

In addition, locating the automatic flow regulator 50 in the vacuum transfer tube 20 improves the effectiveness of the automatic flow regulator 50 insofar as the vacuum transfer tube 20 has the correct high transfer velocity. Furthermore, the vacuum transfer tube 20 is generally not near the work floor and, as such, locating the automatic flow regulator 50 in the vacuum transfer tube 20 minimizes the amount of debris sucked in through the automatic flow regulator 50. Moreover, the automatic flow regulator 50 may be more easily oriented in a direction so as to minimize the suction of unwanted debris through the automatic flow regulator 50.

Figure 2:
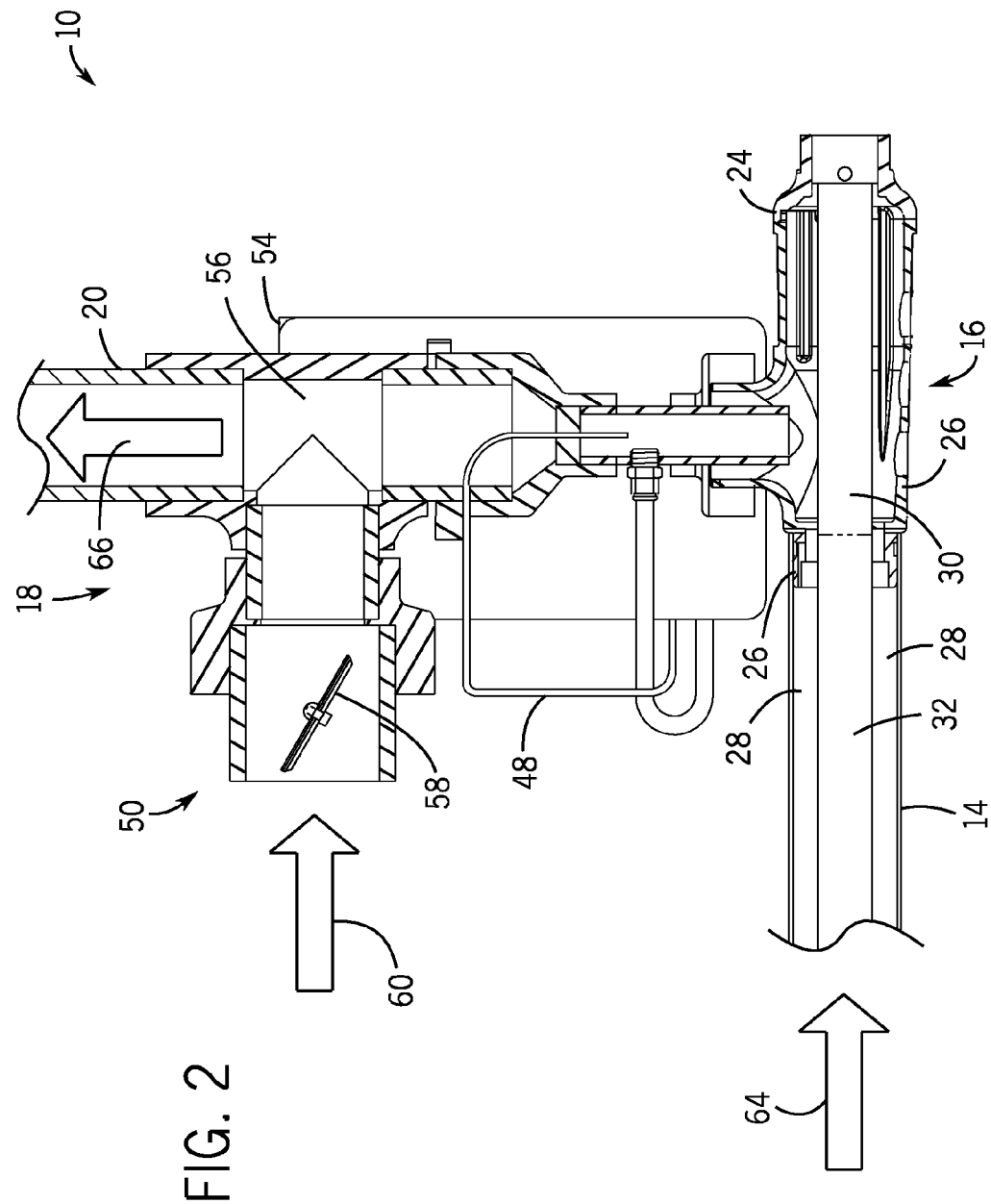
FIG. 2 is a cross-sectional side view of an embodiment of the automatic flow control assembly in accordance with aspects of the present disclosure.
Figure 3:
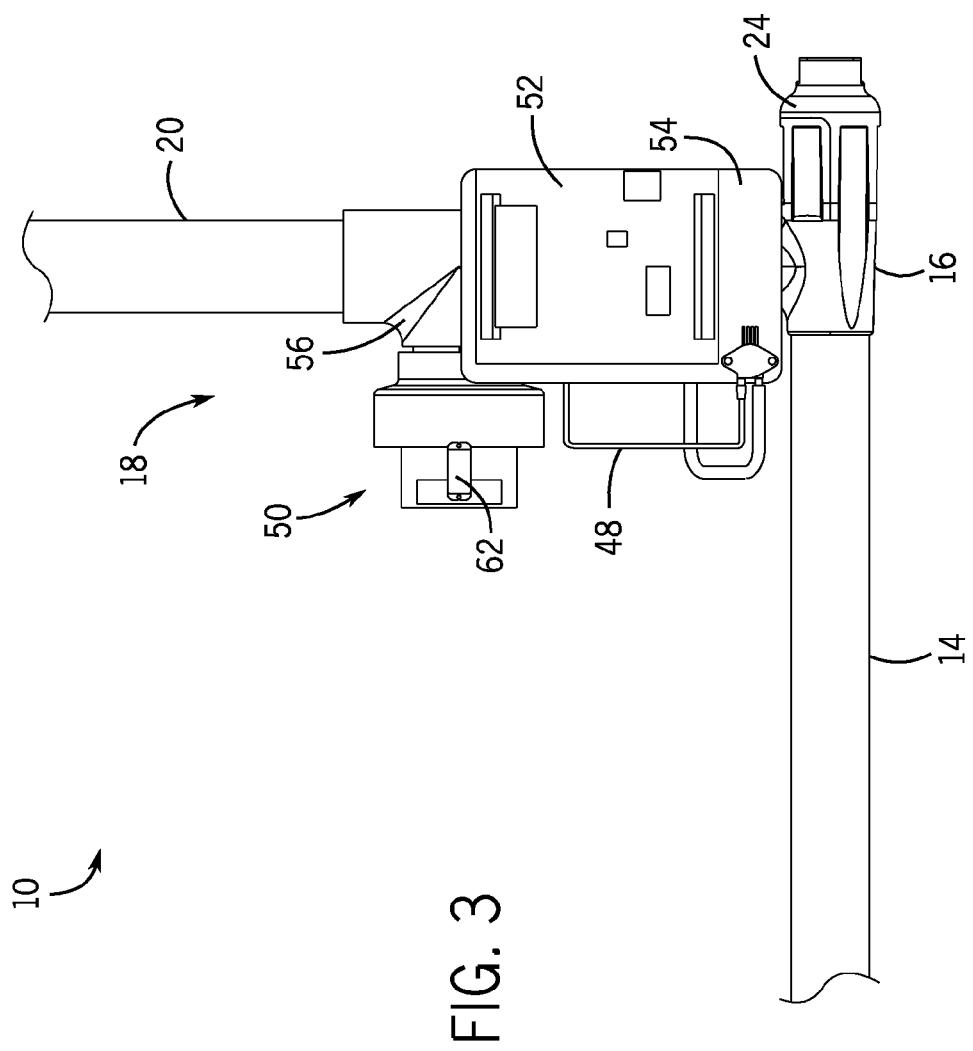
FIG. 3 is a side view of an embodiment of the automatic flow control assembly in accordance with aspects of the present disclosure.
Figure 4:
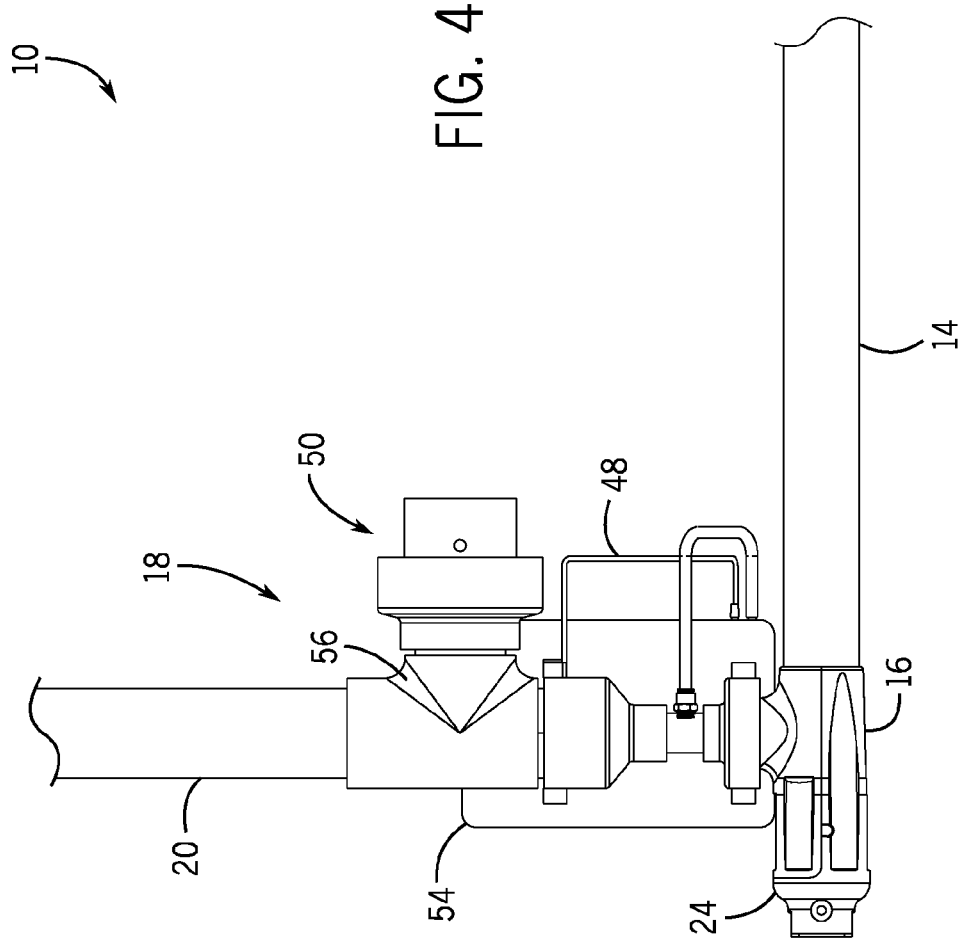
FIG. 4 is a side view of an embodiment of the automatic flow control assembly in accordance with aspects of the present disclosure.

FIG. 2 is a cross-sectional side view of an embodiment of the automatic flow control assembly 10 in accordance with aspects of the present disclosure. As illustrated, in certain embodiments, the sensor 48 may include a pitot tube, which may be particularly appropriate for use in the fume gun assembly 10 insofar as pitot tubes are relatively cheap, accurate, and small. It will be understood that the pitot tube sensor 48 includes the pressure line illustrated in FIGS. 2-5, which connects the pitot tube dynamic pressure side to a differential sensor that, in certain embodiments, may be located on a control chip 52 (shown in FIGS. 3 and 5). The pitot tube sensor 48 conveys a pressure differential to the control chip 52 on a circuit board assembly 54. Based on the pressure differential measured by the pitot tube sensor 48, the control chip 52 determines the corresponding vacuum flow rate (e.g., using calibration curves) through the vacuum transfer tube 20 upstream of a T-junction 56 at which the automatic flow regulator 50 connects to the vacuum transfer tube 20. Based on this determined vacuum flow rate, the control chip 52 determines an appropriate opening position of a butterfly valve 58 of the automatic flow regulator 50 that will allow a certain amount of ambient air 60 to enter the vacuum transfer tube 20 through the automatic flow regulator 50. In particular, in certain embodiments, the control chip 52 sends a signal to a servo motor 62 (shown in FIGS. 3 and 5) to cause the butterfly valve 58 to be rotated into an appropriate opening position to allow a specific amount of ambient air 60 into the vacuum transfer tube 20 such that an amount of vacuum flow 64 from the fume gun 12 is either increased or decreased, without modifying an amount of vacuum flow 66 generated by the vacuum system 22.

In certain embodiments, automatically controlling the automatic flow regulator 50 in this manner may ensure that a relatively constant vacuum flow 64 from the fume gun 12 is maintained, and that the amount of vacuum flow 64 from the fume gun 12 is lower than the amount of vacuum flow 66 suctioned into the vacuum system 22. In addition, in certain embodiments, the control chip 52 may control the automatic flow regulator 50 such that the amount of vacuum flow 64 from the fume gun 12 is automatically adjusted to account for certain welding settings and/or real-time parameters such as welding process type (e.g., metal inert gas (MIG), tungsten inert gas (TIG), and so forth), voltage, current, wire feed speed, wire diameter, workpiece material thickness, and so forth, associated with the fume gun 12.

Although illustrated in FIGS. 2-5 as being a pitot tube sensor, in other embodiments, the sensor 48 may be any suitable type of sensor capable of determining a vacuum flow rate in the fume gun 12, the vacuum and weld cable assembly 14, the vacuum transfer attachment 16, the vacuum transfer tube 20, the vacuum system 22, or any other component of the automatic flow control assembly 10. For example, in certain embodiments, the sensor 48 may measure calibrated pressure differential in the handle 48 of the fume gun 12. In other embodiments, the sensor 48 may be any one of the following: a rotameter, a hotwire anemometer, a mechanical flow meter (e.g. a piston meter, a rotary piston, a turbine flow meter, a Pelton wheel, and so forth), a pressure-based meter (e.g. a pitot tube, a Venturi meter, a multi-hole pressure probe, and so forth), an optical flow meter, a thermal mass flow meter, a vortex flow meter, an electromagnetic flow meter, an ultrasonic flow meter, a coriolis flow meter, or a combination thereof.

Figure 5:
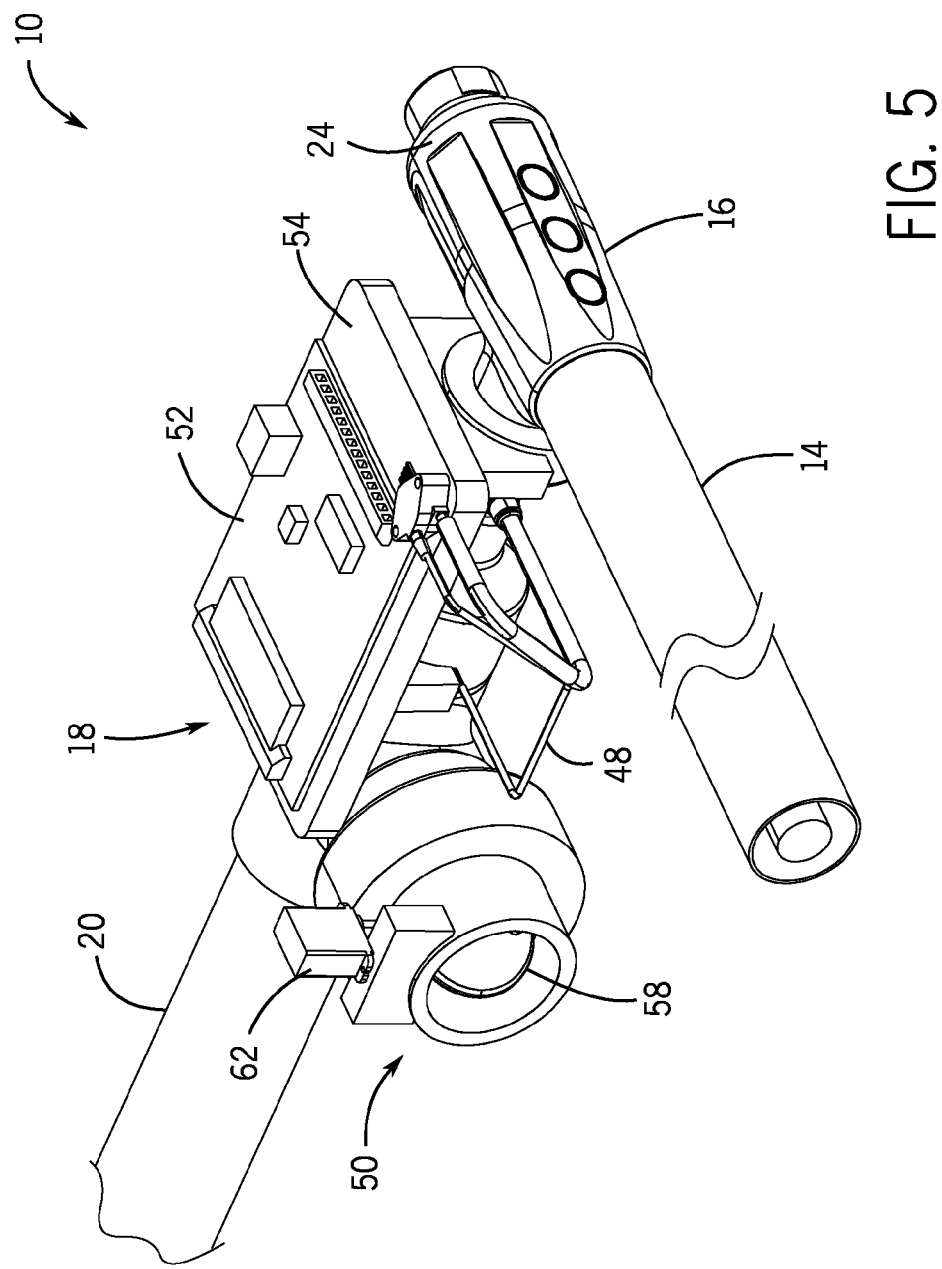
FIG. 5 is a perspective view of an embodiment of the automatic flow control assembly in accordance with aspects of the present disclosure.

In addition, although illustrated in FIGS. 2 and 5 as being a butterfly valve 58, in other embodiments, the mechanism for adjusting the flow of ambient air 60 through the automatic flow regulator 50 may be any suitable mechanism capable of being actuated to ensure than an appropriate amount of ambient air 60 enters the vacuum system assembly 18 and mixes with the vacuum flow. For example, in certain embodiments, the mechanism for adjusting the flow of ambient air 60 through the automatic flow regulator 50 may be a gate valve, a ball valve, a needle valve, and so forth.

In certain embodiments, the control chip 52 may include a processor and memory for performing the necessary calculations related to determining the vacuum flow rate, and determining an appropriate amount of ambient air 60 to be allowed into the vacuum system assembly 18, and for sending signals to the servo motor 62 (or other suitable actuation mechanism) for actuating the butterfly valve 58 (or other flow regulation device) such that the appropriate amount of ambient air 60 enters the vacuum system assembly 18 and mixes with the vacuum flow. The power required to power the control chip 52, the servo motor 62, and other components of the vacuum system assembly 18 that require power may be supplied from any number of suitable power sources. For example, in certain embodiments, this power may be supplied by a welding wire feeder from which the fume gun 12 receives welding wire, by the vacuum system 22, by an external source (e.g., from a power outlet), or may be internally generated within the automatic flow control assembly 10 (e.g., using a turbine).

The automatic flow control assembly 10 described herein provides several tangible benefits as compared to conventional fume gun assemblies. First, components of the automatic flow control assembly 10 may be easily retrofit into pre-existing fume gun assemblies. For example, in certain situations, it may be possible to simply replace a pre-existing vacuum transfer tube with the vacuum transfer tube 20 described herein (e.g., including the sensor 48, the automatic flow regulator 50, the circuit board assembly 54, and other components directly connected to the vacuum transfer tube 20). More specifically, as described above, the vacuum system 22 may be any type of vacuum system, including those capable of operating at only one setting (or a limited number of discrete settings), with the sensor 48, control chip 52, and automatic flow regulator 50 automatically adjusting the vacuum flow rate suctioned from the fume gun 12.

In addition, the automatic flow control assembly 10 described herein improves the quality of the weld while capturing a high amount of fumes. Furthermore, the automatic flow control assembly 10 described herein has a very low chance of overheating, as opposed to conventional fume gun assemblies. Moreover, the automatic flow control assembly 10 described herein is capable of automatically adjusting the vacuum flow rate such that little to no input is required by the operator of the automatic flow control assembly 10. More specifically, the automatic flow control assembly 10 takes a flow or pressure measurement and, through electronic controls and processing, adjusts a variable valve that bleeds ambient air into the vacuum system assembly 18. As such, the automatic flow control assembly 10 may be capable of adjusting the vacuum flow rate from the fume gun 12 to any value from zero to the maximum vacuum flow rate that may be suctioned by the vacuum system 22.

As described above, the automatic flow control assembly 10 is configured to adjust the vacuum flow rate suctioned through the fume gun 12 to be less than the vacuum flow rate that the vacuum system 22 is configured to suction. The fume gun 12 is configured to suction weld fumes and other particulates from the weld puddle area to a remote vacuum extraction device (e.g., the vacuum system 22). In certain embodiments, the fume gun 12 is capable of suctioning less than approximately 20 cubic feet per minute (cfm) of air, weld fumes, and other particulates, as opposed to conventional fume guns, which typically suction greater than approximately 30 cfm of air, weld fumes, and other particulates. In other words, the fume gun 12 facilitates the use of less powerful vacuum systems, and enables the capture of air, weld fumes, and other particulates with less disruption to the weld shielding gas.

In certain embodiments, the cross-sectional area of the vacuum flow passage 28 may be less than approximately 0.38 square inches at a location where the fume gun 12 abuts the vacuum and weld cable assembly 14, as opposed to conventional vacuum flow cables, which may have cross-sectional vacuum areas of 1.1 square inches (or even greater). As such, the vacuum and weld cable assembly 14 may be much smaller than conventional vacuum flow cables. Therefore, the vacuum and weld cable assembly 14 will also be generally lighter and more flexible than conventional vacuum flow cables, thereby reducing the overall cost and enhancing the usability of the vacuum and weld cable assembly 14 and, indeed, the system as a whole.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An automatic flow control assembly, comprising:
a vacuum system configured to suction a vacuum fume flow into a fume inlet of a welding fume gun and through an internal passage of the welding fume gun;
a weld cable assembly coupled to the welding fume gun, wherein the weld cable assembly comprises a weld cable and an upstream portion of a vacuum passage fluidly coupled to the internal passage of the welding fume gun;
a vacuum transfer attachment coupled to an end of the weld cable assembly opposite the welding fume gun, wherein the vacuum transfer attachment is configured to separate a downstream portion of the vacuum passage from the weld cable assembly;
a vacuum transfer tube coupled between the vacuum system and the vacuum transfer attachment, wherein the vacuum transfer tube fluidly couples the vacuum passage to the vacuum system;
a sensor disposed within the vacuum fume flow and configured to measure a parameter related to the vacuum fume flow;
a flow regulation device configured to regulate an ambient air flow through an ambient air inlet into the vacuum fume flow, wherein the ambient aft inlet is disposed downstream of the vacuum transfer attachment; and
control circuitry configured to control the flow regulation device based at least in part on the measured parameter related to the vacuum fume flow.

2. The automatic flow control assembly of claim 1, wherein the control circuitry is configured to control the flow regulation device based at least in part on weld settings or real-time weld parameters associated with the welding fume gun.

3. The automatic flow control assembly of claim 1, wherein the measured parameter related to the vacuum fume flow is a pressure, a pressure differential, a flow rate, or a combination thereof.

4. The automatic flow control assembly of claim 1, wherein the sensor is located in a handle of the welding fume gun.

5. The automatic flow control assembly of claim 1, wherein the sensor is located in the vacuum passage of the weld cable assembly.

6. The automatic flow control assembly of claim 1, wherein the sensor is located in the vacuum transfer attachment that connects the weld cable assembly attached to the welding fume gun to the vacuum transfer tube attached to the vacuum system.

7. The automatic flow control assembly of claim 1, wherein the sensor is located in the vacuum transfer tube that connects the vacuum system to the weld cable assembly attached to the welding fume gun.

8. The automatic flow control assembly of claim 1, wherein the flow regulation device is located in the vacuum transfer tube that connects the vacuum system to the vacuum transfer attachment.

9. The automatic flow control assembly of claim 1, wherein the flow regulation device is located in the vacuum system proximate to the vacuum transfer tube that connects the vacuum system to the vacuum transfer attachment.

10. The automatic flow control assembly of claim 1, wherein the sensor comprises a pitot tube.

11. The automatic flow control assembly of claim 1, wherein the sensor comprises a rotameter, a hotwire anemometer, a mechanical flow meter, a pressure-based meter, an optical flow meter, a thermal mass flow meter, a vortex flow meter, an electromagnetic flow meter, an ultrasonic flow meter, a coriolis flow meter, or a combination thereof.

12. The automatic flow control assembly of claim 1, wherein the flow regulation device comprises a butterfly valve actuated by a servo motor, wherein the control circuitry is configured to control actuation of the servo motor based at least in part on the measured parameter related to the vacuum fume flow.

13. The automatic flow control assembly of claim 1, wherein the flow regulation device comprises a gate valve, a ball valve, or a needle valve.

14. A method, comprising:
suctioning a vacuum fume flow through:
a fume inlet of a welding fume gun, an internal passage of the welding fume gun;
a vacuum passage having an upstream portion extending through a weld cable assembly coupled to the welding fume gun;
a vacuum transfer attachment coupled to an end of the weld cable assembly opposite the welding fume gun, wherein the vacuum transfer attachment is configured to separate a downstream portion of the vacuum passage from the weld cable assembly; and
a vacuum transfer tube coupled between a vacuum system and the vacuum transfer attachment, wherein the vacuum transfer tube fluidly couples the vacuum passage to the vacuum system;
measuring a parameter related to the vacuum fume flow suctioned through the welding fume gun; and
regulating an ambient air flow through an ambient air inlet into the vacuum fume flow, via a flow regulation device, based at least in part on the measured parameter related to the vacuum fume flow, wherein the ambient air inlet is disposed downstream of the vacuum transfer attachment.

15. The method of claim 14, comprising regulating the ambient air flow through the ambient air inlet and into the vacuum fume flow based at least in part on weld settings or real-time weld parameters associated with the welding fume gun.

16. The method of claim 14, comprising measuring the parameter related to the vacuum fume flow using a pitot tube sensor.

17. The method of claim 14, wherein regulating the ambient air flow through an ambient air inlet and into the vacuum fume flow comprises controlling a servo motor that actuates a butterfly valve.

18. The method of claim 14, comprising regulating the ambient air flow introduced into the vacuum fume flow without operator intervention.

19. An automatic flow control assembly, comprising:
a welding fume gun comprising an internal passage configured to facilitate suctioning of welding fumes from a welding workpiece through a fume inlet of the welding fume gun;
a weld cable assembly comprising a weld cable and an upstream portion of a vacuum passage fluidly coupled to the internal passage of the welding fume gun, wherein the weld cable connects the welding fume gun to a welding system;
a vacuum transfer attachment coupled to an end of the weld cable assembly opposite the welding fume gun, wherein the vacuum transfer attachment is configured to separate a downstream portion of the vacuum passage from the weld cable assembly;
a vacuum transfer tube coupled to the vacuum transfer attachment, wherein the vacuum transfer tube fluidly couples the vacuum passage to a vacuum system;
a vacuum system assembly connected to the vacuum transfer tube, wherein the vacuum system assembly comprises:
the vacuum system configured to generate a substantially constant vacuum to suction the welding fumes through the fume inlet of the welding fume gun and into the internal passage of the welding fume gun, the weld cable assembly, the vacuum transfer attachment, and the vacuum transfer tube;
a pilot tube sensor at least partially disposed in the vacuum transfer tube, wherein the pilot tube sensor is configured to measure a pressure differential associated with a flow of the welding fumes through the vacuum transfer tube;
a butterfly valve actuated by a servo motor, wherein the butterfly valve and the servo motor are disposed in an ambient air flow line adjacent the vacuum transfer tube, wherein the butterfly valve is configured to regulate a flow of ambient air through an ambient air inlet remote from the welding fume gun and into the flow of welding fumes through the vacuum transfer tube, wherein the ambient air inlet is disposed downstream of the weld cable assembly; and
control circuitry configured to control actuation of the servo motor based at least in part on the pressure differential measured by the pilot tube sensor.

* * * * *